United States Patent
Kamon et al.

(10) Patent No.: US 9,900,549 B2
(45) Date of Patent: Feb. 20, 2018

(54) IMAGE SIGNAL GENERATING APPARATUS, IMAGE INSPECTION APPARATUS, PRINTING SYSTEM, AND IMAGE SIGNAL GENERATING METHOD

(71) Applicant: SCREEN HOLDINGS CO., LTD., Kyoto-shi, Kyoto (JP)

(72) Inventors: Hiroaki Kamon, Kyoto (JP); Kazuki Fukui, Kyoto (JP); Kunio Muraji, Kyoto (JP)

(73) Assignee: SCREEN HOLDINGS CO., LTD, Kyoto (JP)

( * ) Notice: Subject to any disclaimer, the term of this patent is extended or adjusted under 35 U.S.C. 154(b) by 138 days.

(21) Appl. No.: 14/699,909

(22) Filed: Apr. 29, 2015

(65) Prior Publication Data
US 2015/0319404 A1 Nov. 5, 2015

(30) Foreign Application Priority Data
Apr. 30, 2014 (JP) .................................. 2014-093875

(51) Int. Cl.
| | | |
|---|---|---|
| H04N 9/47 | (2006.01) |
| H04N 5/93 | (2006.01) |
| H04N 9/87 | (2006.01) |
| H04N 9/44 | (2006.01) |
| H04N 5/376 | (2011.01) |

(Continued)

(52) U.S. Cl.
CPC ............ *H04N 5/93* (2013.01); *H04N 1/3935* (2013.01); *H04N 1/40068* (2013.01);
(Continued)

(58) Field of Classification Search
CPC .. H04N 5/93; H04N 9/87; H04N 9/44; H04N 1/40068; H04N 5/3572; H04N 1/3935; H04N 5/3765

(Continued)

(56) References Cited

U.S. PATENT DOCUMENTS

| | | | | | |
|---|---|---|---|---|---|
| 4,734,785 A | * | 3/1988 | Takei | .................. | H04N 1/3935 358/451 |
| 4,851,922 A | * | 7/1989 | Takayama | ............ | H04N 1/3935 358/451 |

(Continued)

FOREIGN PATENT DOCUMENTS

| | | |
|---|---|---|
| EP | 1457335 A1 | 9/2004 |
| JP | 1-293007 A | 11/1989 |

(Continued)

OTHER PUBLICATIONS

Extended European Search Report EP Application No. 15164876.3 dated Oct. 5, 2015.

(Continued)

*Primary Examiner* — Mohammed Rahaman
*Assistant Examiner* — Richard Carter
(74) *Attorney, Agent, or Firm* — McDermott Will & Emery LLP

(57) ABSTRACT

Image data is accurately resized in real time by downscaling. An image signal generating apparatus includes a parameter generator that dynamically generates a parameter PM and an image signal generator that repeats processing of generating an output image signal Q in response to each sampling signal B. Each parameter includes a division ratio parameter DP. The division ratio parameter DP corresponds to a ratio of a second time period Tb and a third time period Tc other than the second time period Tb. The second time period Tb is a time interval until the generation of a sampling signal $B_n$ in a first time period Ta until input of an immediate timing signal $A_{k+1}$ since input of a last timing signal $A_k$. The image signal generator repeatedly generates a first weighted signal and a second weighted signal of the image signal in response to each sampling signal $B_n$.

5 Claims, 12 Drawing Sheets

(51) Int. Cl.
*H04N 5/357* (2011.01)
*H04N 1/393* (2006.01)
*H04N 1/40* (2006.01)

(52) U.S. Cl.
CPC ......... *H04N 5/3572* (2013.01); *H04N 5/3765* (2013.01); *H04N 9/44* (2013.01); *H04N 9/87* (2013.01)

(58) Field of Classification Search
USPC ............. 348/88; 358/451, 1.2; 382/106, 144
See application file for complete search history.

(56) References Cited

U.S. PATENT DOCUMENTS

| | | | |
|---|---|---|---|
| 5,724,259 | A | 3/1998 | Seymour et al. |
| 5,801,678 | A | 9/1998 | Huang et al. |
| 2005/0078020 | A1 | 4/2005 | Oizumi et al. |
| 2005/0134870 | A1* | 6/2005 | Kugo ............... G06T 3/4007 358/1.2 |
| 2006/0232702 | A1 | 10/2006 | Joskin et al. |
| 2008/0050007 | A1* | 2/2008 | Oaki ............... G06K 9/6212 382/144 |
| 2015/0117719 | A1* | 4/2015 | Sakai ............... G06T 5/20 382/106 |

FOREIGN PATENT DOCUMENTS

| | | |
|---|---|---|
| JP | 2005-166026 A | 6/2005 |
| JP | 2007-019853 A | 1/2007 |

OTHER PUBLICATIONS

Office Action issued in corresponding Japanese Patent Application No. 2014-093875, dated Sep. 5, 2017.

\* cited by examiner

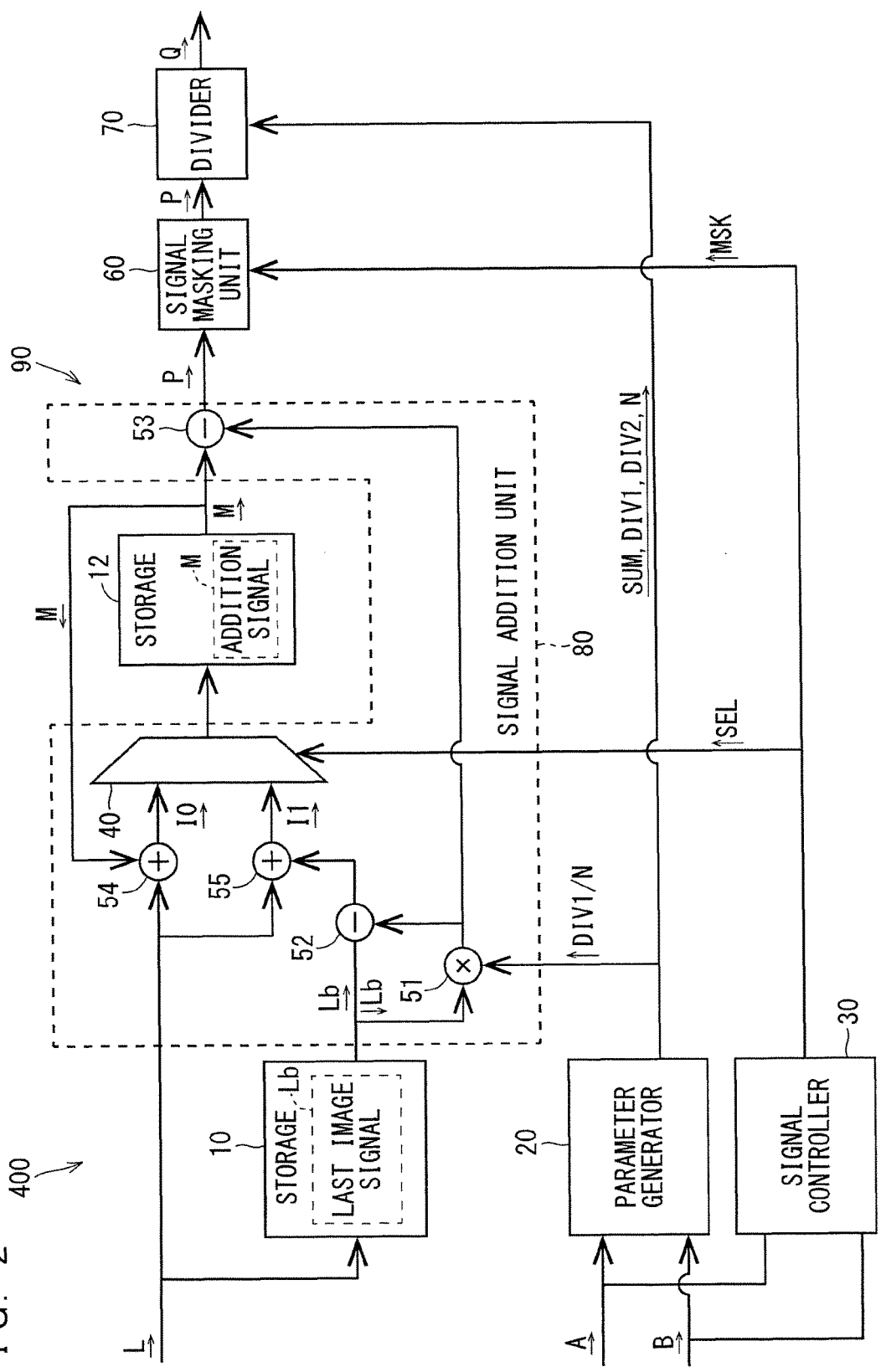
F I G. 2

IMAGE SIGNAL GENERATING APPARATUS, IMAGE INSPECTION APPARATUS, PRINTING SYSTEM, AND IMAGE SIGNAL GENERATING METHOD

BACKGROUND OF THE INVENTION

Field of the Invention

The present invention relates to a signal processing technology of resizing an image signal.

Description of the Background Art

As to a technique of resizing input signals such as an image signal, for example, in Japanese Patent Application Laid-Open No. 1-293007 discloses a sampling filter that reduces a frequency F of the input signal to a frequency F/M (M is an integer).

In downscaling an input image signal input in synchronization with a timing signal to the image signal synchronized with a sampling signal having a slower period by the technique, a scale factor of a signal interval of the timing signal and a signal interval of the sampling signal is previously acquired, and it is necessary to set a resizing ratio for resizing processing of generating (reconstructing) an output image signal using an average value of the plural input image signals.

In the technique, in the case that the output image signal is generated in synchronization with the sampling signal having an unknown period, because a parameter used in resizing processing performed by an image signal generating circuit (resizing circuit) is not fixed, there is a problem in that the average value of the input image signals cannot be obtained with the proper scale factor.

In the case that an interval of the timing signal or sampling signal is unequal, because previously-set scale factors for the periods of the timing signal and sampling signal differ from the actual scale factors, there is a problem in that the resizing is hardly performed by accurately obtaining the average value.

Specifically, for example, in a printing system that performs printing while inspecting a printed image, in the case that the image signal sequentially output from a camera provided with a line sensor, which extends in parallel with a paper surface so as to be orthogonal to a main scanning direction, at constant time intervals is resized in synchronization with an encoder signal corresponding to a paper conveying speed, the paper conveying speed varies due to expansion and contraction of paper, and the period of the encoder signal varies. For this reason, a resizing ratio cannot properly be corrected, but the resizing is locally performed with the scale factor different from actual one, which results in a possibility that a false inspection result is generated.

SUMMARY OF THE INVENTION

The present invention is aimed at an image signal generating apparatus.

According to one aspect of the present invention, an image signal generating apparatus includes: a parameter generator; a first processing element that sequentially inputs plural image signals L in synchronization with each timing signal A generated in time series; a second processing element that sequentially inputs each sampling signal B generated in time series; a third processing element that dynamically generates a parameter PM in response to the generation of the each sampling signal B, the parameter PM expressing a temporal relationship between the generation of the each timing signal A and the generation of the each sampling signal B; and an image signal generator including; a fourth processing element that identifies a series of image signals in the plural image signals L, the series of image signals corresponding to a time period until the generation of the sampling signal $B_{n+1}$ since the generation of the sampling signal $B_n$, n being an index indicating a series of integers, a fifth processing element that reconstructs the series of image signals based on parameter values $PM_n$ and $PM_{n+1}$ to generate an output image signal $Q_n$ corresponding to the sampling signal $B_n$, the parameter values $PM_n$ and $PM_{n+1}$ being values provided to the parameter PM according to sampling signals $B_n$ and $B_{n+1}$ temporally adjacent to each other, and a sixth processing element that repeatedly activates the fourth and fifth processing elements while updating the number n.

The parameter value $PM_n$ includes a division ratio parameter DP, the division ratio parameter DP reflecting a ratio at which a first time period Ta is divided into a second time period Tb and a third time period Tc.

The first time period Ta is a time interval until the generation of a timing signal $A_{k+1}$ since the generation of a timing signal $A_k$, the sampling signal $B_n$ is generated in the first time period Ta, k being an integer defined by an integer n, the second time period Tb is a time interval until the generation of the sampling signal $B_n$ since the generation of the timing signal $A_k$, and the third time period Tc is a time interval in which the second time period Tb is excluded from the first time period Ta.

The fifth processing element includes; a processing element that generates a first weighted signal Wa and a second weighted signal Wb based on the division ratio parameter DP, the first weighted signal Wa being obtained by weighting a value of an image signal $L_k$ according to a first ratio Rf=Tb/Ta, the second weighted signal Wb being obtained by weighting the image signal $L_k$ according to a second ratio Rs=Tc/Ta, and a processing element that generates the output image signal $Q_n$, using the first weighted signal $Wa_{n+1}$ generated according to the sampling signal $B_{n+1}$ and the second weighted signal $Wb_n$ already generated according to the sampling signal $B_n$.

In the image signal generating apparatus of the present invention, the parameter PM including the division ratio parameter DP are dynamically and repeatedly generated in response to each sampling signal B. The processing of generating the output image signal Q is repeated in response to each sampling signal B using the first weighted signal Wa and second weighted signal Wb, which are generated based on the division ratio parameter DP. Accordingly, image data can accurately be resized in real time by downscaling even if a period of the sampling signal B is unknown or varies temporally.

In the image signal generating apparatus, preferably the parameter generator counts the division ratio parameter DP as a multiple number of a unit time period UT, and the unit time period UT is obtained by dividing the first time period Ta by a predetermined natural number.

In the image signal generating apparatus, preferably the parameter generator measures the time interval of the timing signals $A_k$ and $A_{k+1}$ adjacent to each other in a time-series manner, and generates the division ratio parameter DP based on a measured value.

In the image signal generating apparatus, preferably the parameter generator uses a time period until input of a timing signal $A_{j+1}$ since input of a timing signal $A_j$ as a value of the first time period Ta, where j is less than k.

The present invention is also aimed at an image inspection apparatus that determines whether a target image satisfies a previously-set condition by comparing the target image to a previously-set reference image, the target image being provided as a signal string of the output image signal $Q_n$ repeatedly output from the image signal generating apparatus.

The present invention is also aimed at a printing system including the image inspection apparatus, the printing system printing an image on a print medium while conveying the print medium.

The present invention is also aimed at an image signal generating method including each step corresponding to an operation of the image signal generating apparatus.

Therefore, an object of the present invention is to provide a technology of accurately resizing the image data in real time by the downscaling even if the period of the sampling signal is unknown or varies temporally.

These and other objects, features, aspects and advantages of the present invention will become more apparent from the following detailed description of the present invention when taken in conjunction with the accompanying drawings.

BRIEF DESCRIPTION OF THE DRAWING

FIG. 2 is a block diagram illustrating a configuration example of an image signal generating apparatus according to the preferred embodiment of the present invention;

DESCRIPTION OF THE PREFERRED EMBODIMENTS

Figure 1:
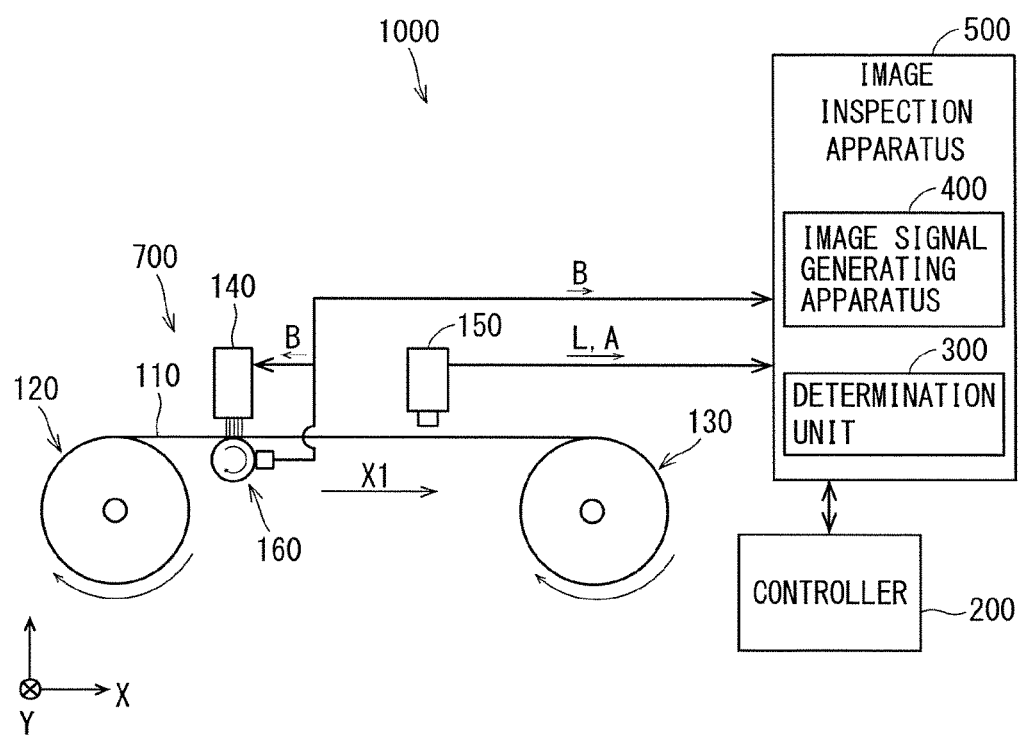
FIG. 1 is a block diagram illustrating a configuration example of a printing system according to a preferred embodiment of the present invention.

Hereinafter, a preferred embodiment of the present invention will be described with reference to the drawings. In the drawings, components having similar configuration and function are designated by the identical numeral, and the overlapping description is omitted. Each drawing is schematically illustrated. An XYZ-orthogonal-coordinate axis is added to some of the drawings in order to indicate a direction. The direction of a Z-axis in the XYZ-orthogonal-coordinate axis indicates a direction of a vertical line, and an XY-plane indicates a horizontal plane.

<Configuration of Printing System>

FIG. 1 is a block diagram illustrating a configuration example of a printing system 1000 according to the preferred embodiment of the present invention.

The printing system 1000 includes a printing apparatus 700 that prints a print medium 110, an image inspection apparatus 500 that inspects an image printed on the print medium 110, and a controller 200 that is electrically connected to the printing apparatus 700 and the image inspection apparatus 500 to wholly control an operation of the printing system 1000. For example, the controller 200 is constructed with a general computer. The controller 200 also controls the operations of a delivery roller 120, a winding roller 130, a printing unit 140, and a camera 150.

The printing apparatus 700 includes a delivery roller 120 and a winding roller 130. The delivery roller 120 delivers the print medium 110, such as paper, which is wound around the delivery roller 120 by rotation in a predetermined direction. The winding roller 130 rewinds and accommodates the delivered print medium 110 by rotation in a predetermined direction. The delivery roller 120 and the winding roller 130 are a conveying unit that conveys the print medium 110, and the print medium 110 is conveyed in a conveying direction X1 (+X-direction) along a predetermined conveying passage in a horizontal plane such that a printing surface of the print medium 110 faces the printing unit 140.

The printing apparatus 700 also includes the printing unit 140, the camera 150, and an encoder 160. The printing unit 140 is constructed with a print head such as an inkjet head, and prints an image on an upper surface of the print medium 110 conveyed along the conveying passage according to image data supplied from the controller 200.

The camera 150 includes a line sensor that extends in a direction orthogonal to the conveying passage of the print medium 110 along the horizontal plane, and the line sensor is constructed with an imaging cell array. The camera 150 temporally sequentially photographs the conveyed print medium 110 in which the image is already printed. Each imaging cell temporally sequentially generates an image signal L of the photographed image. Each image signal is sequentially supplied to an image signal generating apparatus 400 in a time-series manner. The camera 150 repeatedly generates a pulse signal (timing signal) A in synchronization with each photographing timing, and sequentially supplies each generated pulse signal as each timing signal to the image signal generating apparatus 400 in the time-series manner. For example, the pulse signal (timing signal) A is repeatedly generated every 44 microseconds.

For example, the encoder 160 includes a rotating member that abuts on the print medium 110 to rotate by movement of the print medium 110, and the encoder 160 repeatedly generates a pulse signal (encoder signal and sampling signal) B every time a rotation angle of the rotating member becomes a predetermined angle. Therefore, the encoder 160 generates the pulse signal every time an increase in conveying distance of the print medium 110 reaches a predetermined distance, and the encoder 160 sequentially outputs each generated pulse signal as each sampling signal to the image signal generating apparatus 400 through a data line in the time-series manner.

Each pulse signal output from the encoder 160 is also supplied to the printing unit 140. The printing unit 140 performs a printing operation in response to each supplied pulse signal. For example, the print medium 110 is conveyed at a speed of 200 m/minute. For example, the sampling signal B is repeatedly generated every about 90 microseconds. The print medium 110 expands and contracts by an influence of humidity. Therefore, the conveying speed of the print medium 110 varies, and a generation interval of the sampling signal B also varies.

The image inspection apparatus 500 includes the image signal generating apparatus 400 and a determination unit 300 that is constructed with an FA computer. The determination unit 300 compares the image data generated by an output image signal output from the image signal generating apparatus 400 to previously-set reference image data, and determines whether the image data satisfies a previously-set condition. For example, a determination result is used to remove a portion in which the image that does not satisfy the condition is printed in the print medium 110. At this point, the printing system 1000 includes the camera 150 and the encoder 160 by way of example. However, the timing signal and the sampling signal are not limited to the output from the line camera and the encoder.

<Configuration of Image Signal Generating Apparatus>

FIG. 2 is a block diagram illustrating a configuration example of the image signal generating apparatus 400 of the preferred embodiment. The image signal generating apparatus 400 resizes each image signal L that is sequentially input in time series in synchronization with each timing signal A supplied from camera 150, and temporally sequentially repeats generation of an output image signal Q.

The image signal generating apparatus 400 includes storages 10 and 12, a parameter generator 20, a signal controller 30, and an image signal generator 90.

The image signal generator 90 includes a signal addition unit 80, a signal masking unit 60, and a divider 70. The image signal generator 90 temporally sequentially repeats the generation and output of the output image signal Q.

The signal addition unit 80 includes a multiplexer 40, a multiplier 51, subtracters 52 and 53, and adders 54 and 55. The signal addition unit 80 temporally sequentially repeats the generation of a corrected addition signal P, and supplies the corrected addition signal P to the signal masking unit 60.

Desirably the image signal generating apparatus 400 is constructed with a FPGA, and each functional unit of the image signal generating apparatus 400 is made by a part of the FPGA. The image signal generating apparatus 400 has the configuration in FIG. 2 with respect to each imaging cell array of the camera 150. That is, a portion that processes each image signal supplied in time series from one imaging cell is representatively illustrated in FIG. 2. Accordingly, the image signal generating apparatus 400 generates plural output image signals (as many as the imaging cells) that are of the time-series signals.

Figure 4:
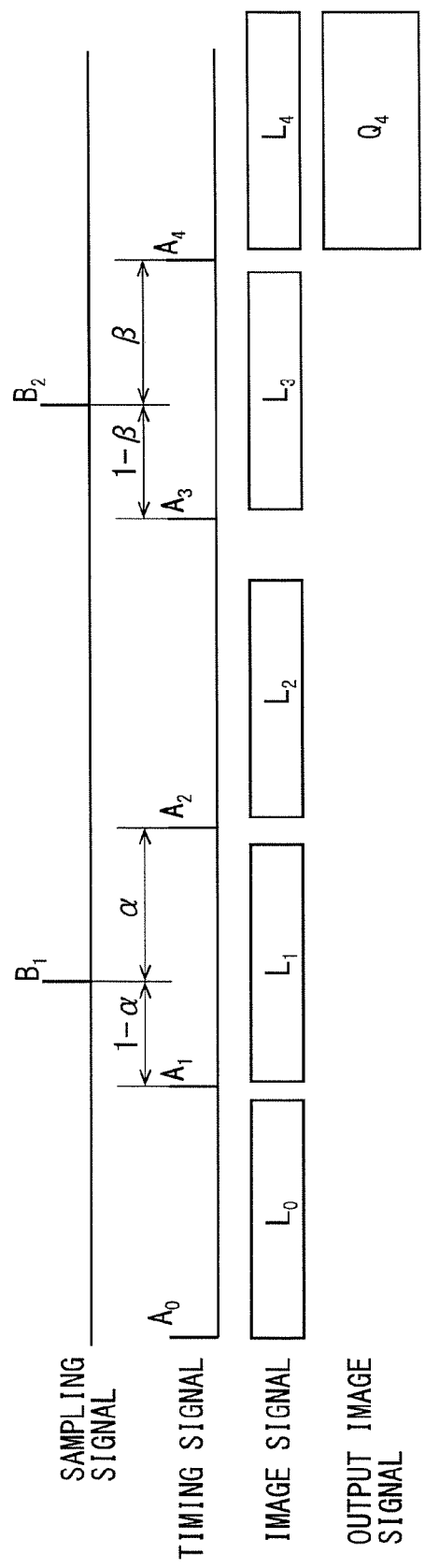
FIG. 4 is a timing chart easily illustrating generation of an output image signal.

FIG. 4 is a timing chart easily illustrating the generation of the output image signal by the image signal generating apparatus 400.

In FIG. 4, timing signals $A_0$ to $A_4$ (generally, $A_k$) are sequentially input in time series to the image signal generating apparatus 400. In synchronization with the timing signals $A_0$ to $A_4$, image signals $L_0$ to $L_4$ (generally, $L_k$) are input to the image signal generating apparatus 400. At this point, "k" in the symbols $A_k$ and $L_k$ is an index indicating an integer corresponding to input order. Sampling signals $B_1$ and $B_2$ (generally, $B_n$) are also input to the image signal generating apparatus 400 in parallel with the timing signals $A_0$ to $A_4$. At this point, "n" in the symbol $B_n$ is another index indicating an integer corresponding to the input order. A time interval (period) of the sampling signals $B_1$ and $B_2$ is set longer than a time interval (in this case, constant period) of the timing signals $A_0$ to $A_4$.

The sampling signal $B_1$ is input during the time period (first time period Ta) of the timing signals $A_1$ and $A_2$. A ratio of the time period (second time period Tb) from the timing signal $A_1$ to the sampling signal $B_1$ and the time period (third time period Tc) from the sampling signal $B_1$ to the timing signal $A_2$ is $(1-\alpha):\alpha$. Naming of the first to third time periods is also used in terms of temporal relationship between the timing signals $A_3$ and $A_4$ and the sampling signal $B_2$.

That is, the sampling signal $B_2$ is input during the time period (first time period Ta) of the timing signals $A_3$ and $A_4$. A ratio of the time period (second time period Tb) from the timing signal $A_3$ to the sampling signal $B_2$ and the time period (third time period Tc) from the sampling signal $B_2$ to the timing signal $A_4$ is $(1-\beta):\beta$.

An output image signal $Q_4$ (generally, $Q_{n-1}$) is a signal that is generated based on image signals $L_1$ to $L_3$ according to the time period of the sampling signals $B_1$ and $B_2$ (generally, $\beta_{n-1}$ and $B_n$), and the output image signal $Q_4$ is obtained by an equation (1).

[Mathematical formula 1]

$$Q_4 = \frac{\alpha L_1 + L_2 + (1-\beta)L_3}{\alpha + 2 - \beta} \quad (1)$$

The storage 10 is constructed with a memory including a delay circuit. The plural image signals are sequentially supplied in time series from the camera 150 to the storage 10. FIG. 2 illustrates a state in which one image signal L in the image signals is supplied. A last image signal $Lb = L_{k-1}$ of the image signal L is stored in the storage 10 by the delay circuit, and the last image signal Lb is supplied to the multiplier 51 and the subtracter 52.

Figure 3:
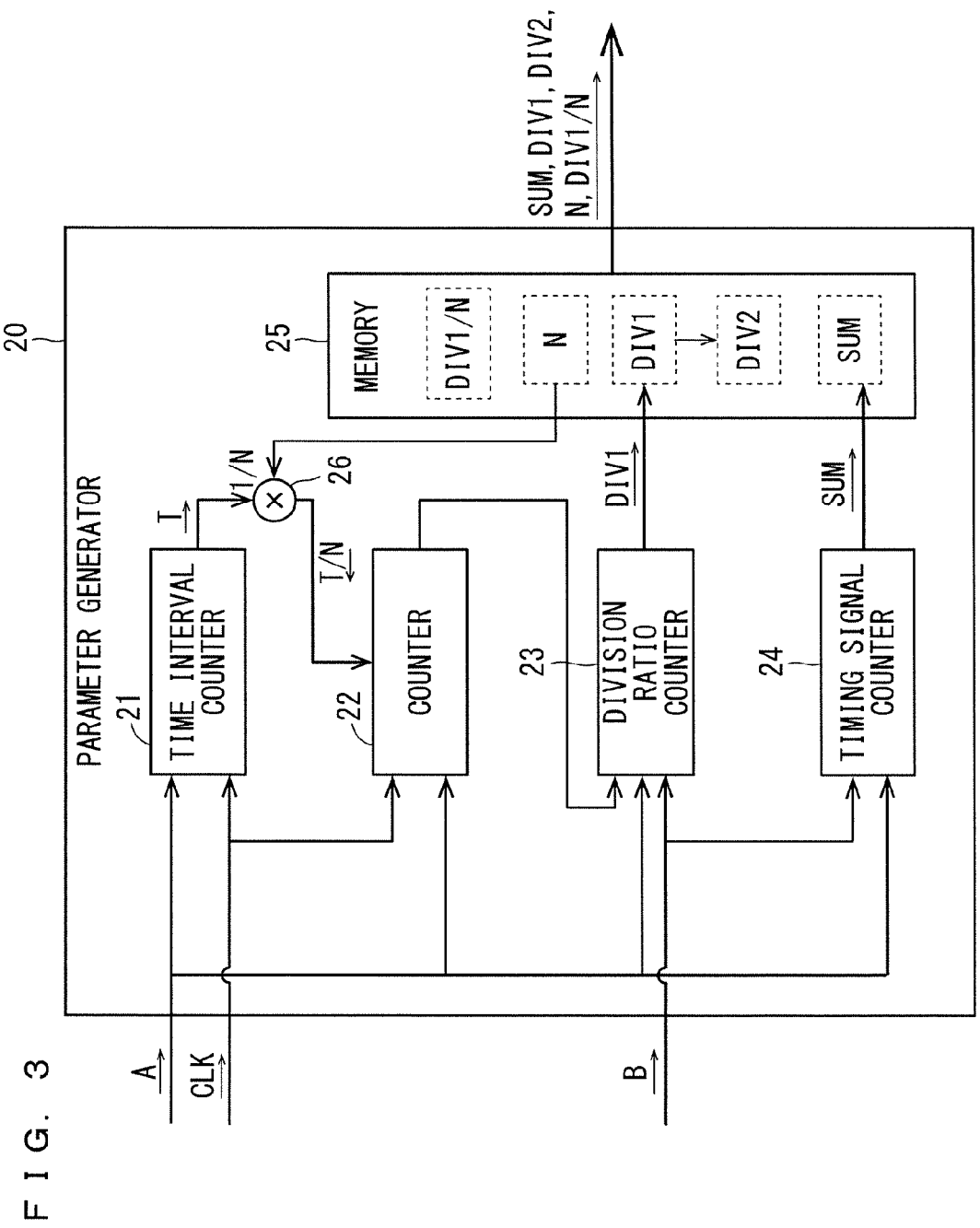
FIG. 3 is a block diagram illustrating a configuration example of a parameter generator in FIG. 2.

Based on each timing signal (the state in which one timing signal A in the timing signals is supplied is illustrated in FIGS. 2 and 3) sequentially input in time series from the camera 150 and each sampling signal (the state in which one sampling signal B in the sampling signals is supplied is illustrated in FIGS. 2 and 3) sequentially input in time series from the encoder 160, the parameter generator 20 dynamically and repeatedly generates a parameter PM (exactly, is a parameter group such as a timing signal number SUM, a division ratio parameter DIV1, a last division ratio parameter DIV2, and a natural number N. In the specification, properly the parameter group is also referred to as a "parameter" or a "resizing parameter") expressing a temporal relationship between each timing signal A and each sampling signal B in response to each sampling signal B. That is, a parameter value including the parameter PM is variable, and a new value is provided to the parameter value every time the sampling signal B is newly input.

Each parameter PM generated by the parameter generator 20 includes a division ratio parameter DP. The division ratio parameter DP corresponds to a ratio of a second time period Tb until the input of the sampling signal $B_n$, since the input of the last timing signal $A_k$ in a first time period Ta until the input of an immediate timing signal $A_{k+1}$ since the input of the last timing signal $A_k$ and a third time period Tc other than the second time period Tb in the first time period Ta. The last timing signal $A_k$ is input just before the corresponding sampling signal $B_n$, and the immediate timing signal $A_{k+1}$ is input just after the last timing signal $A_k$.

Based on the temporal relationship between the timing signal A and the sampling signal B, the signal controller 30 supplies a selection control signal SEL to the multiplexer 40, and supplies a mask signal MSK to the signal masking unit 60.

A number DIV1/N in which a division ratio parameter value DPa=DIV1 is divided by a natural number N is supplied to the multiplier 51 from the parameter generator 20, and the last image signal $Lb = L_{k-1}$ is supplied to the multiplier 51 from the storage 10. The multiplier 51 supplies a signal in which the last image signal Lb is multiplied by the number DIV1/N to the subtracters 52 and 53.

The subtracter 52 subtracts the signal output by the multiplier 51 from the last image signal Lb supplied by the storage 10, and outputs a difference to the adder 55.

The adder 55 supplies a signal I1, in which the signal supplied from the subtracter 52 is added to the present image signal L, to the multiplexer 40. The signal I1 is supplied from the multiplexer 40 to the storage 12 when the selection control signal SEL is 1, and is stored in the storage 12 as an initial value of an addition signal M. The signal I1 is obtained by an equation (2) using the image signal L=$L_k$ and the last image signal Lb=$L_{k-1}$.

[Mathematical formula 2]

$$I1 = \frac{N - DIV1}{N} Lb + L \quad (2)$$

The adder 54 supplies a signal I0, in which the addition signal M supplied from the storage 12 is added to the present image signal L, to the multiplexer 40. The signal I0 is obtained by an equation (3).

[Mathematical formula 3]

$$I0 = M + L \quad (3)$$

The multiplexer 40 supplies the signal I0, which is supplied from the adder 54 when the selection control signal SEL is 0, to the storage 12. The multiplexer 40 supplies the signal I1, which is supplied from the adder 55 when the selection control signal SEL is 1, to the storage 12.

The signal (also referred to as the addition signal M) supplied from the multiplexer 40 is stored in the storage 12, and the storage 12 supplies the addition signal M to the subtracter 53 and the adder 54. The subtracter 53 subtracts the signal, which is supplied from the multiplier 51, from the addition signal M supplied from the storage 12 to the subtracter 53. The difference signal is a corrected addition signal P.

The signal masking unit 60 supplies the corrected addition signal P, which is supplied from the subtracter 53 when the mask signal MSK is 0, to the divider 70, and the signal masking unit 60 interrupts the corrected addition signal P when the mask signal MSK is 1.

Based on the corrected addition signal P supplied from the signal masking unit 60 and the timing signal number SUM, division ratio parameter value DPa=DIV1, last division ratio parameter value DPb=DIV2, and natural number N that are supplied from the parameter generator 20, for example, the divider 70 generates a divisor VD obtained by an equation (4), generates a value of the output image signal Q by dividing the corrected addition signal P by the divisor VD, and supplies the value of the output image signal Q to the determination unit 300 of the image inspection apparatus 500. An operation of each unit of the image signal generating apparatus 400 is described later with reference to flowcharts.

[Mathematical formula 4]

$$VD = (N - DIV2)/N + (SUM - 1) + DIV1/N \quad (4)$$

<Parameter Generator>

FIG. 3 is a block diagram illustrating a configuration example of the parameter generator 20.

The parameter generator 20 includes a time interval counter 21, a counter 22, a division ratio counter 23, a timing signal counter 24, and a memory 25.

The timing signal A, the sampling signal B, and a clock signal CLK of the image signal generating apparatus 400 are input to the parameter generator 20. For example, a period of the clock signal CLK is set to 5 nanoseconds.

The time interval counter 21 obtains a time interval T by counting the number of clock signals CLK input to the time interval counter 21 at input time intervals of the timing signals A, and outputs the time interval T to a multiplier 26. The natural number N of 2 or more is previously stored in the memory 25. Desirably powers of 2 such as 128 and 256 are stored as the natural number N. In this case, division with an integer N can be made by bit shift, and a division time is shortened.

The multiplier 26 divides the time interval T by the natural number N using the bit shift, and outputs a result (T/N) to the counter 22.

The timing signal A and the clock signal CLK are input to the counter 22. The counter 22 is reset by the timing signal A, counts the number of clock signals CLK, and outputs a carry signal to the division ratio counter 23 every time the number of clock signals CLK reaches a number T/N.

The timing signal A and the sampling signal B are also input to the division ratio counter 23. The division ratio counter 23 resets a count value by the input of the timing signal A, counts each carry signal until the sampling signal B is input from the counter 22, and supplies the resultant count value (division ratio parameter) DIV1 to the memory 25. That is, for each sampling signal $B_n$, with a time period in which the corresponding first time period Ta (the time period from the timing signal $A_k$ just before the sampling signal $B_n$ to the timing signal $A_{k+1}$ just after the sampling signal $B_n$) is divided by a predetermined natural number N as a unit time period UT, the parameter generator 20 generates the division ratio parameter DP=DIV1 by counting how many times the corresponding second time period Tb (the time period from the timing signal $A_k$ just before the sampling signal $B_n$ to the sampling signal $B_n$) is longer than the unit time period UT.

The division ratio parameter DIV1 is generated based on the measured time interval T. The parameter generator 20 sequentially measures the time interval of the timing signals $A_k$ and $A_{k+1}$ adjacent to each other in time series in the timing signals, and generates the division ratio parameter DP=DIV1 corresponding to each sampling signal $B_n$, based on the measured value. More particularly, the time interval of the timing signal $A_{k+1}$ used to reset the count value and the last timing signal $A_k$ is used to count the division ratio parameter DIV1. Desirably the time interval of the timing signal $A_{k+1}$, that becomes the reset signal and the last timing signal $A_k$ are counted. Alternatively, the time interval T of a previous timing signal $A_{j+1}$ and a last timing signal $A_j$ may be used. The symbol "j" is an integer that satisfies a condition of j<k.

In the parameter generator 20, a length of the time period until the input of the immediate timing signal $A_{j+1}$ since the input of the timing signal $A_j$ before the corresponding last timing signal $A_k$ is used as a length of the corresponding first time period Ta with respect to each sampling signal. Therefore, the division ratio parameter DIV1 can be fixed at the time the sampling signal $B_n$ is input. Using the time interval T from the timing signal $A_k$ of the reset signal to the immediate timing signal $A_{k+1}$, the division ratio parameter DIV1 concerning the sampling signal $B_n$, input between the timing signals $A_k$ and $A_{k+1}$ may be obtained.

The division ratio parameter DIV1 is stored in the memory 25, and the previously-input division ratio parameter DIV1 is also stored as a previous division ratio parameter DIV2 in the memory 25. A number DIV/N is also stored in the memory 25, and the number DIV/N is supplied to multiplier 51 as to be used in the multiplication.

The timing signal A is sequentially input to the timing signal counter 24 at time intervals T. Every time the sampling signal B is input, the timing signal counter 24 resets the count value to count the number of timing signals A, and outputs the count value (timing signal number) SUM of the timing signals A input to the timing signal counter 24 between the sampling signal and the subsequently-input sampling signal to the memory 25. The timing signal number SUM is stored in the memory 25. Each parameter stored in the memory 25 is supplied to the multiplier 51 and the divider 70.

In response to the immediate timing signal $A_{k+1}$ of the sampling signal $B_n$, the memory 25 supplies the number DIV1/N in the stored resizing parameters to the multiplier 51, and supplies the division ratio parameter DIV1, the previous division ratio parameter DIV2, the timing signal number SUM, and the natural number N to the divider 70.

Figure 5:
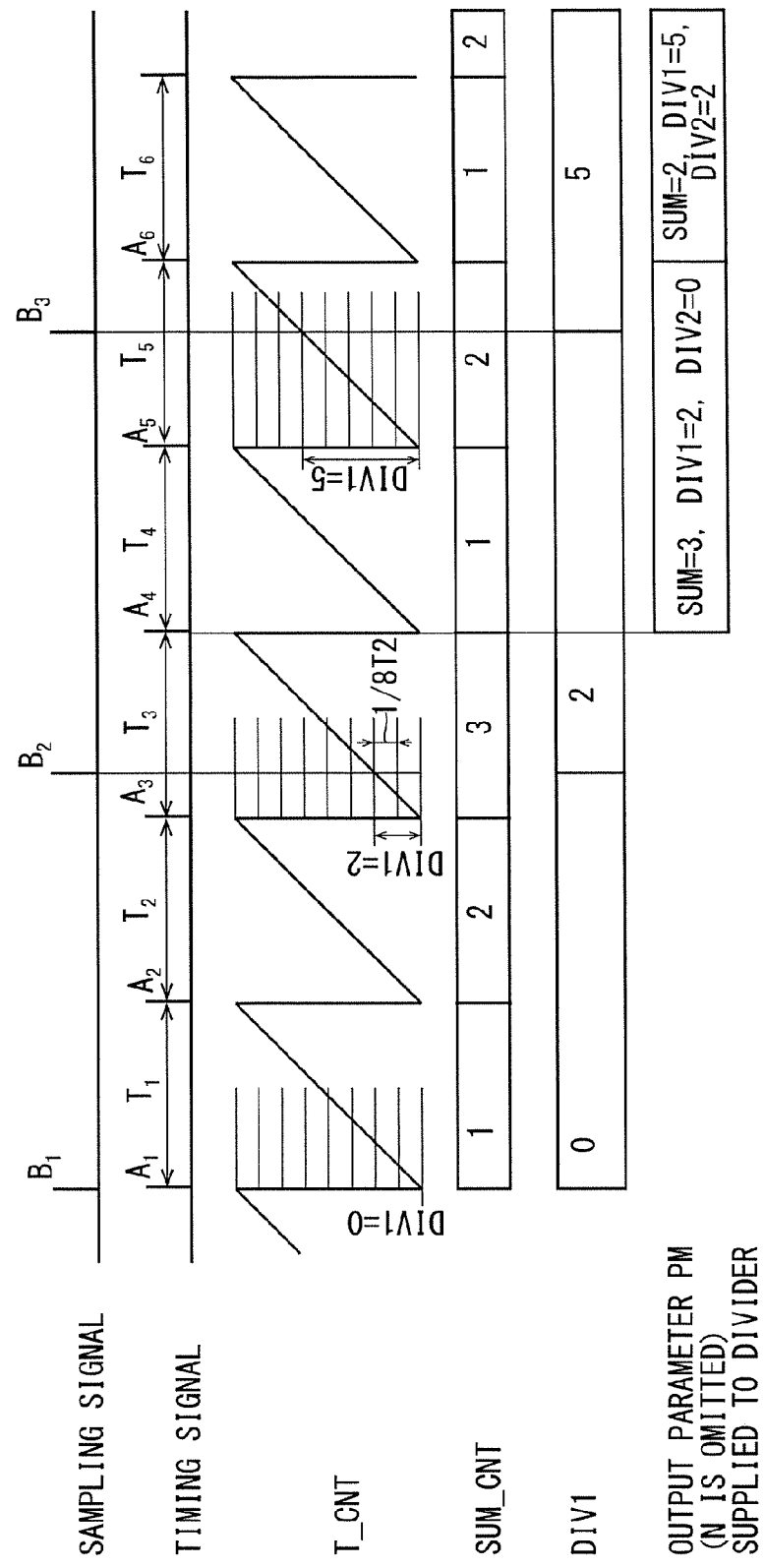
FIG. 5 is a timing chart illustrating an operation of the parameter generator.
Figure 6:
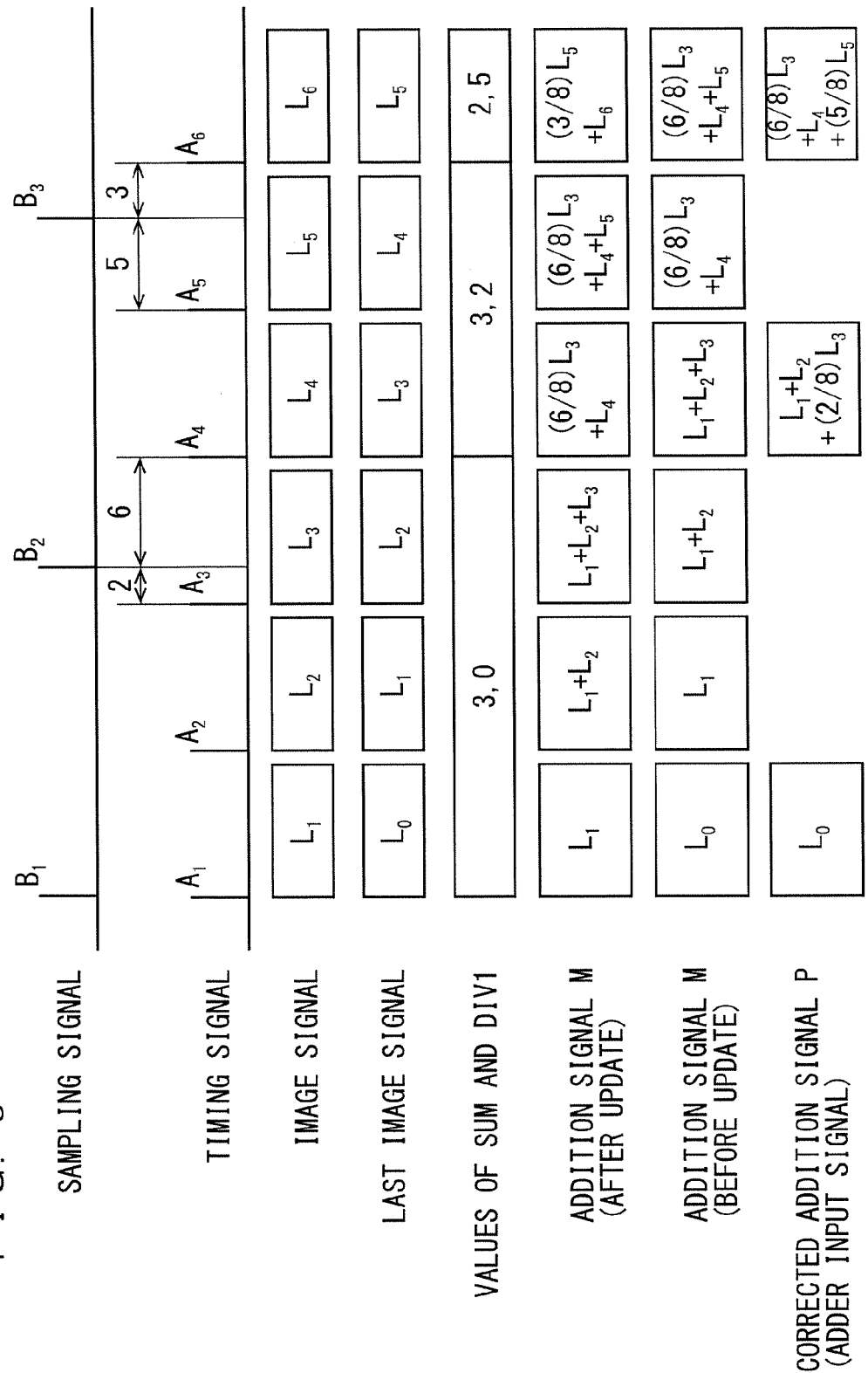
FIG. 6 is a timing chart illustrating an operation of image signal generator.

FIG. 5 is a timing chart illustrating the operation of the parameter generator 20. In FIGS. 5 and 6, natural number (division number) N is 8.

The sampling signals $B_1$ to $B_3$ are sequentially input to the parameter generator 20 in time series. The timing signals $A_1$ to $A_6$ are also input to the parameter generator 20.

The time intervals of the timing signals $A_1$ to $A_6$ and the immediate timing signals $A_2$ to $A_7$ ($A_7$ is not illustrated) are time intervals $T_1$ to $T_6$, respectively. The time intervals $T_1$ to $T_6$ may be equal to or different from one another. A count value T_CNT is a graph of changes in count values of the time intervals $T_1$ to $T_6$. A count value SUM_CNT indicates a variation in count value of the timing signal number SUM. The count values of the division ratio counter 23, which are counted from the sampling signals $B_1$ to $B_3$ to the timing signals $A_1$, $A_3$, and $A_5$ just before the sampling signals $B_1$ to $B_3$, are illustrated as the division ratio parameter DIV1.

<Image Signal Generator>

FIG. 6 is a timing chart illustrating an operation of the image signal generator 90. The sampling signals $B_1$ to $B_3$ and the timing signals $A_1$ to $A_6$ are identical to those in FIG. 5. The image signals $L_1$ to $L_6$ are input to the image signal generating apparatus 400 in synchronization with the timing signals $A_1$ to $A_6$. The last image signals Lb stored in the storage 10 are the image signals $L_0$ to $L_5$, respectively. In this case, the values of the timing signal number SUM and division ratio parameter DIV1 are obtained as illustrated in FIG. 6. The values of the timing signal number SUM and division ratio parameter DIV1 are equal to those in FIG. 5.

The value of the addition signal M just after the input of the sampling signal is illustrated as an "addition signal (before update)". The addition signal M indicated as an "addition signal (after update)" is one in which the addition signal M indicated as the "addition signal (before update)" in the identical line is already updated.

The corrected addition signal P in the lowest line of FIG. 6 is a signal that is supplied from the signal masking unit 60 to the divider 70 when the mask signal MSK is 0 in the corrected addition signals P supplied from the subtracter 53 to the signal masking unit 60. In FIG. 6, the addition signal M and the corrected addition signal P are illustrated in the form of an expression in which the image signal and the parameter are used.

For example, because the division ratio parameter DIV1 is 2 after the timing signal $A_4$, the addition signal M is initialized to a signal $(6/8)L_3+L_4$ using the division ratio parameter DIV1, the natural number N, the image signal $L_4$ synchronized with the timing signal $A_4$, and the last image signal $L_3$. When the timing signal $A_5$ is input, the signal is supplied as a pre-update addition signal M to the adder 54, a signal $(6/8)/L_3+L_4+L_5$ which an image signal $L_5$ synchronized with the timing signal $A_5$ is added to the pre-update addition signal M by the adder 54 is stored as a post-update addition signal M in the storage 12. When the timing signal $A_6$ is input immediately after the sampling signal $B_3$ is input, the addition signal M is updated by the image signal $L_6$ synchronized with the timing signal $A_6$, the image signal $L_5$, the division ratio parameter DIV1 (in this case, 5), and the natural number N. However, the addition signal M is supplied to the subtracter 53 before the update, and the addition signal M is corrected using the division ratio parameter DIV1 and the image signal $L_5$. The correction is performed such that only the signal corresponding to the ratio of the second time period between the timing signal $A_5$ and the sampling signal $B_3$ to the first time period of the timing signals $A_5$ to $A_6$ in the image signal $L_5$ are included in the addition signal corresponding to the time period of the sampling signals $B_2$ and $B_3$. The corrected addition signal P corrected by the correction becomes a signal $(6/8)L_3+L_4+(5/8)L_5$, is supplied to the divider 70 through the signal masking unit 60, and used to calculate the output image signal Q.

<Operation of Image Signal Generating Apparatus>

FIGS. 7 to 12 are flowcharts illustrating an example of the operation of the image signal generating apparatus.

Figure 7:
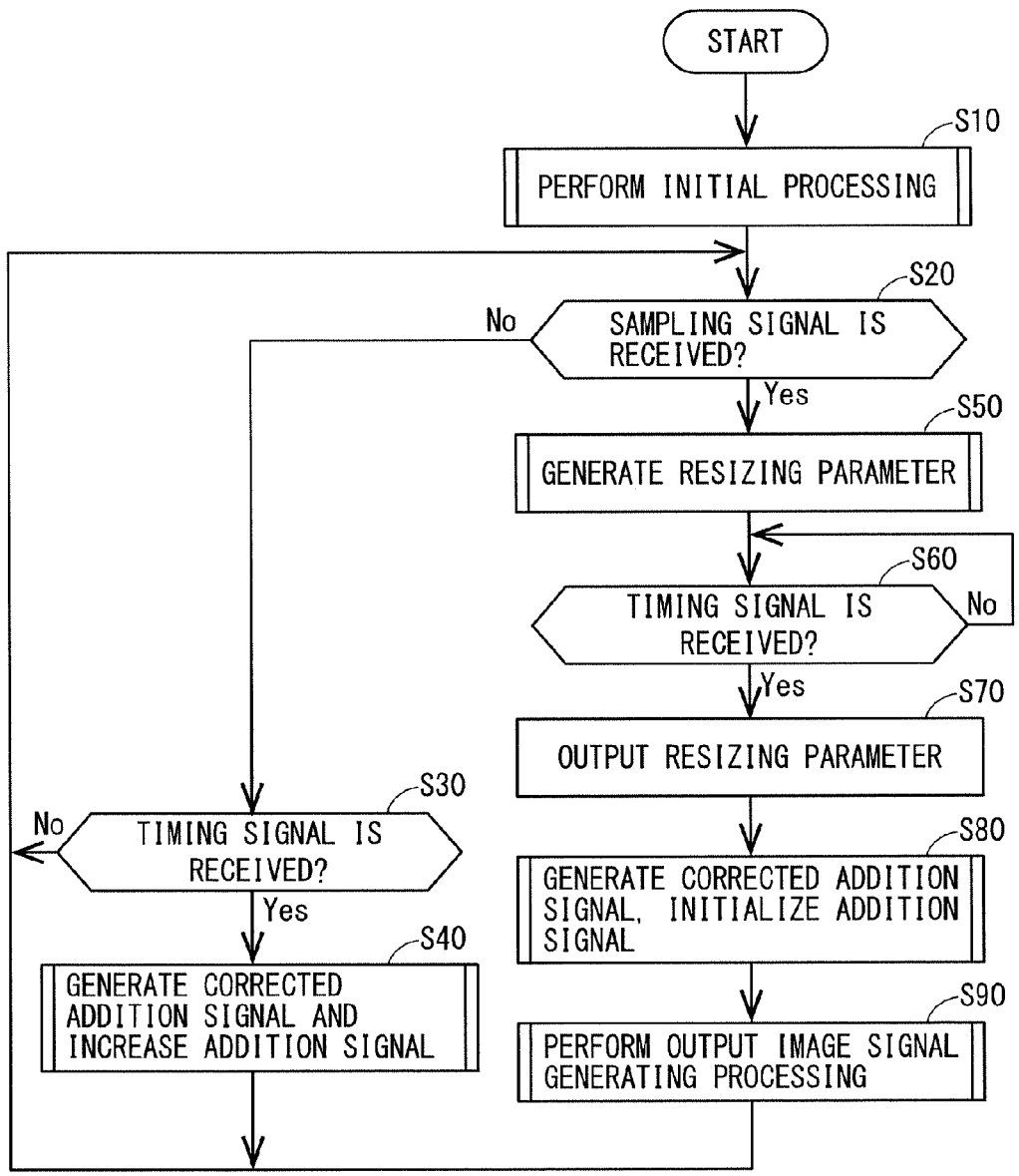
FIG. 7 is a flowchart illustrating an example of the operation of the image signal generating apparatus.

As illustrated in FIG. 7, the image signal generating apparatus 400 performs initial processing (Step S10).

Figure 8:
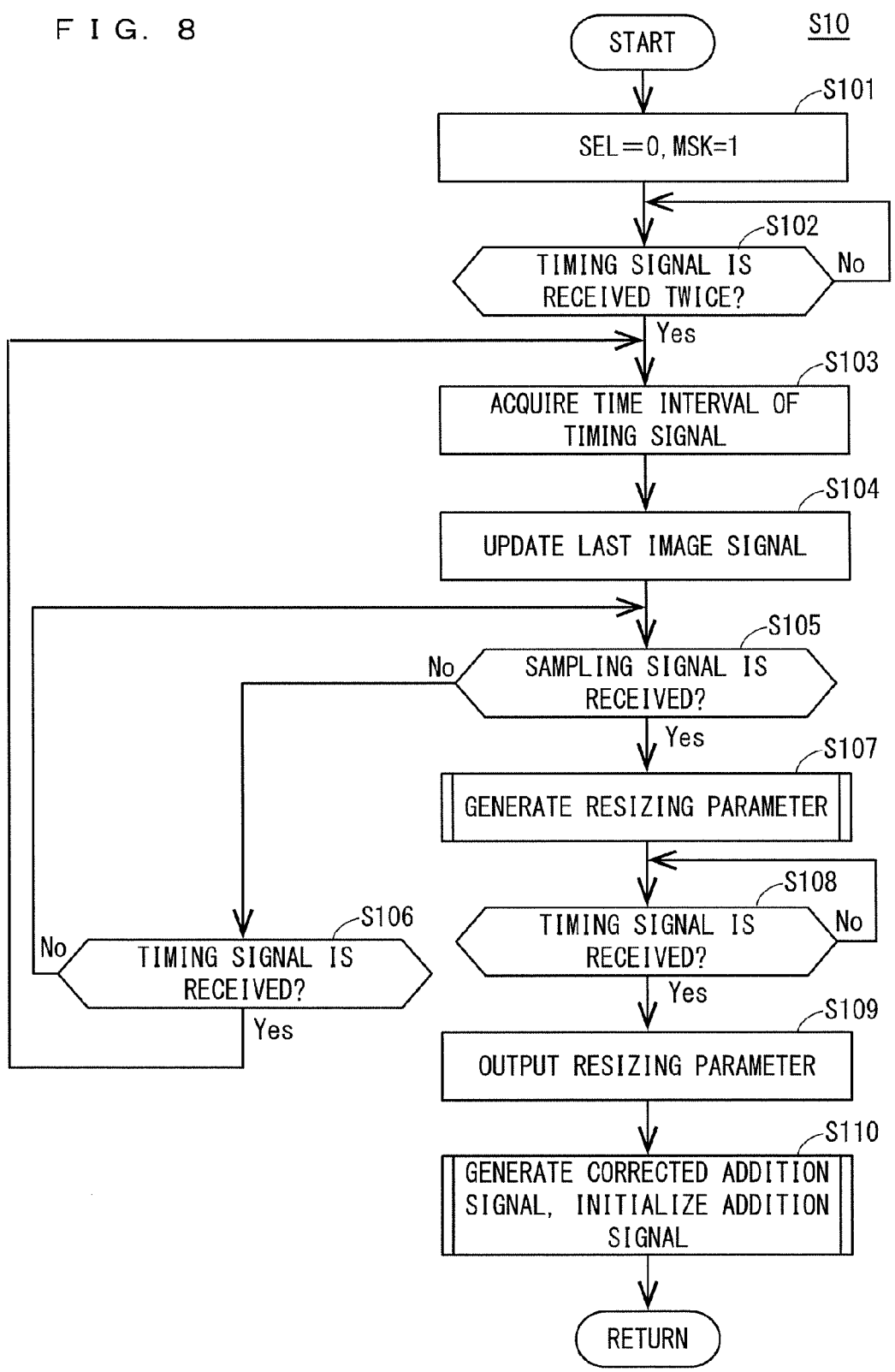
FIG. 8 is a flowchart illustrating an example of the operation of the image signal generating apparatus.

FIG. 8 is a flowchart illustrating an example of the operation of the initial processing. At the time the sampling signal is initially received after starting of the output image signal generating processing, because the image signal that is of a reconstruction processing target is not obtained, the output image signal cannot be generated in response to the sampling signal. Therefore, in the initial processing, the output image signal is not generated in response to the initially-received sampling signal B, but the acquisition of the parameter PM used to generate the output image signal Q corresponding to the subsequent sampling signal B and the initialization of the addition signal M are performed.

When the initial processing is started, the signal controller 30 sets the selection control signal SEL to 0, and sets the mask signal MSK to 1 (Step S101).

In the case that the sampling signal B is input in advance of the timing signal A after the starting of the output image signal generating processing, the division ratio parameter DIV1 cannot be generated with respect to the sampling signal B. In the image signal generating apparatus 400, the division ratio parameter DIV1 is obtained using the time interval between the timing signal $A_k$ just before the sampling signal $B_n$ and the timing signal $A_{k-1}$ just after the sampling signal $B_n$. Therefore, when the processing in Step S101 is completed, the image signal generating apparatus 400 waits until the timing signal is received twice (Step S102).

When the timing signals A are received in Step S102, the parameter generator 20 acquires the time interval T between the received timing signal $A_k$ and the last timing signal $A_{k-1}$ (Step S103). The time interval T may be measured only once when the period of the timing signal is an unknown fixed value, and the time interval T may directly be used when the period of the timing signal is a well-known fixed value.

When the image signal L is input to the image signal generating apparatus 400 in synchronization with the received timing signal, the image signal just before the received image signal is stored as the last image signal Lb in the storage 10 through the delay circuit (Step S104).

Then, the parameter generator 20 waits until the sampling signal or the timing signal A is received (Steps S105 and S106). When the timing signal A is received first, the pieces of processing in Steps S103 to S104 are performed again. When the sampling signal B is received, the parameter generator 20 performs resizing parameter generating processing (Step S107).

Figure 9:
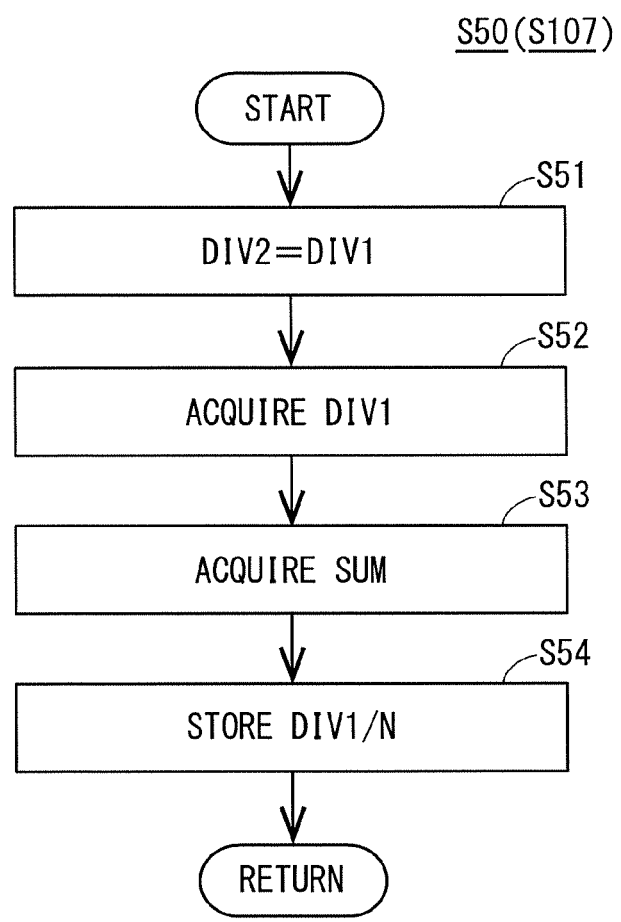
FIG. 9 is a flowchart illustrating an example of the operation of the image signal generating apparatus.

FIG. 9 is a flowchart illustrating an example of the operation of the resizing parameter generating processing in Step S50 of FIG. 7 and Step S107 of FIG. 8. The parameter generator 20 stores the division ratio parameter DIV1 stored in the memory 25 as the previous division ratio parameter DIV2 (Step S51), acquires the division ratio parameter DIV1 (Step S52) to store the division ratio parameter DIV1 in the memory 25, and acquires the timing signal number SUM (Step S53) to store the timing signal number SUM in the memory 25. The parameter generator 20 obtains the number DIV1/N, stores the number DIV1/N in the memory 25 (Step S54), and returns to the original processing.

The parameter generator 20 waits until the timing signal A is received (Step S108). When the timing signal A is received, the parameter generator 20 outputs the resizing parameter stored in the memory 25 to the multiplier 51 and the divider 70 (Step S109), and the image signal generating apparatus 400 performs the generation of the corrected addition signal P and the initialization of the addition signal M (Step S110).

Figure 10:
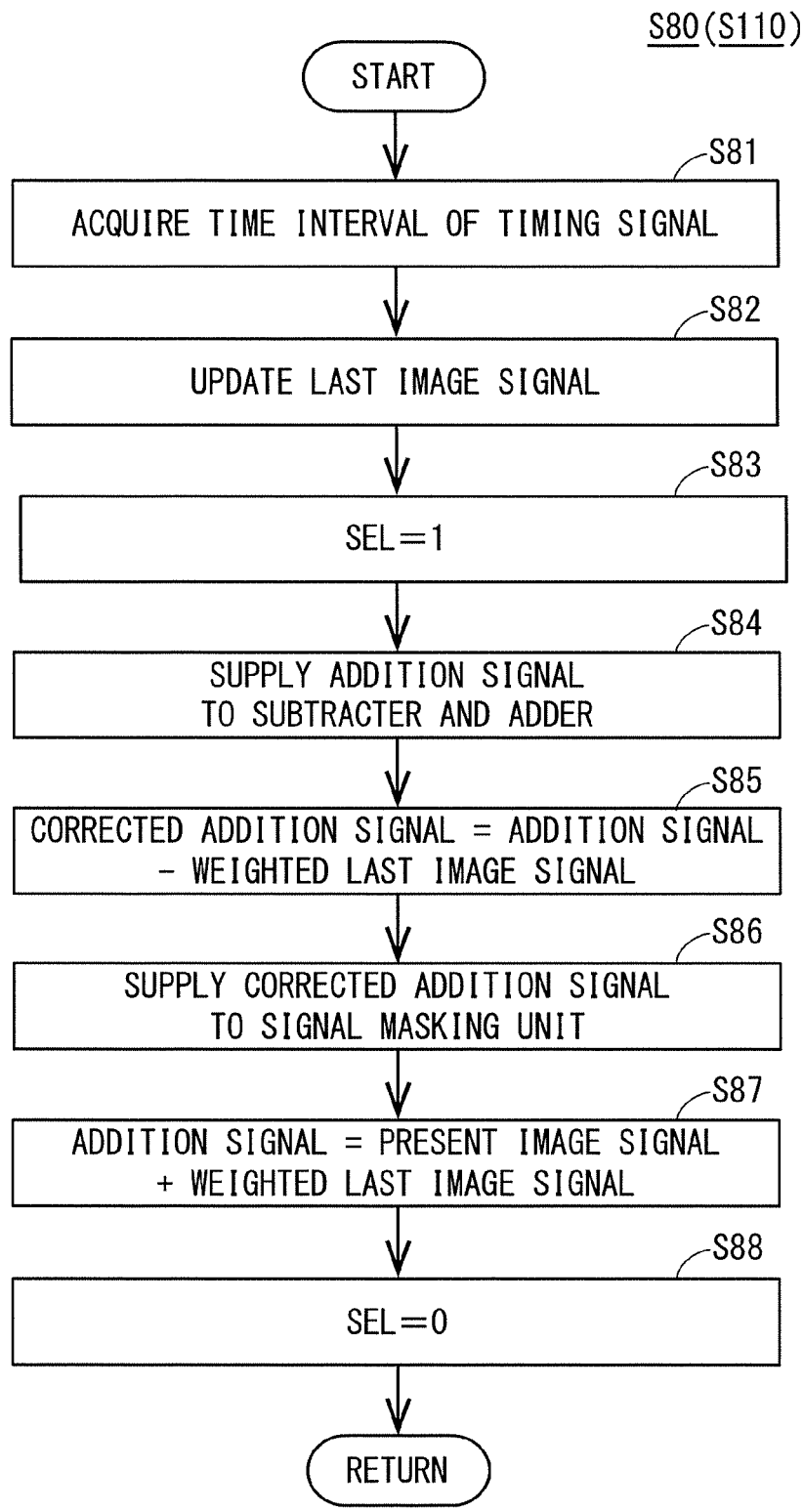
FIG. 10 is a flowchart illustrating an example of the operation of the image signal generating apparatus.

FIG. 10 is a flowchart illustrating an example of the operations of the generation of the corrected addition signal P and the initialization of the addition signal M in Step S80 of FIG. 7 and Step S110 of FIG. 8.

The parameter generator 20 acquires the time interval T between the received timing signal $A_k$ and the last timing signal $A_{k-1}$ (Step S81), the last image signal $L_{k-1}$ of the image signal $L_k$ is stored as the last image signal Lb in the storage 10 through the delay circuit when the image signal $L_k$ is input to the image signal generating apparatus 400 in synchronization with the received timing signal $A_k$ (Step S82).

The signal controller 30 sets the selection control signal SEL to 1 such that the signal is supplied from the adder 55 to the storage 12 (Step S83).

The image signal generating apparatus 400 supplies the addition signal M stored in the storage 12 to the subtracter 53 and the adder 54 (Step S84).

The subtracter 53 generates the corrected addition signal P by subtracting the weighted last image signal Lb from the supplied addition signal M (Step S85), and supplies the corrected addition signal P to the signal masking unit 60 (Step S86). In the image signal generating apparatus 400, a first weighted signal Wa and a second weighted signal Wb are defined, and the corrected addition signal P is obtained by an equation (5). A signal in which a first term of the equation (5) is subtracted from the last image signal Lb is the second weighted signal Wb.

[Mathematical formula 5]

$$P = -\frac{DIV1}{N} \times Lb + M \quad (5)$$

In the initial processing S10, although the generated corrected addition signal P is not supplied to the divider 70 because the mask signal MSK is set to 1, the processing of obtaining the corrected addition signal P is performed similar to the post-initial processing in the circuit configuration of the image signal generating apparatus 400.

Then, the image signal generating apparatus 400 sets a sum of the present image signal L and the last image signal Lb weighted using the number DIV1/N to an initial value of the addition signal M (Step S87). The addition signal M is the signal I1 obtained from the equation (2), and the addition signal M is supplied from the adder 55 to the storage 12. The last image signal Lb weighted using the number DIV1/N is the first weighted signal Wa.

The signal controller 30 sets the selection control signal SEL to 0, and enables the input from the adder 54 to the storage 12 to return the processing (Step S88). Therefore, the processing makes a transition from the initial processing in Step S10 to the Step S20 in FIG. 7.

Figure 11:
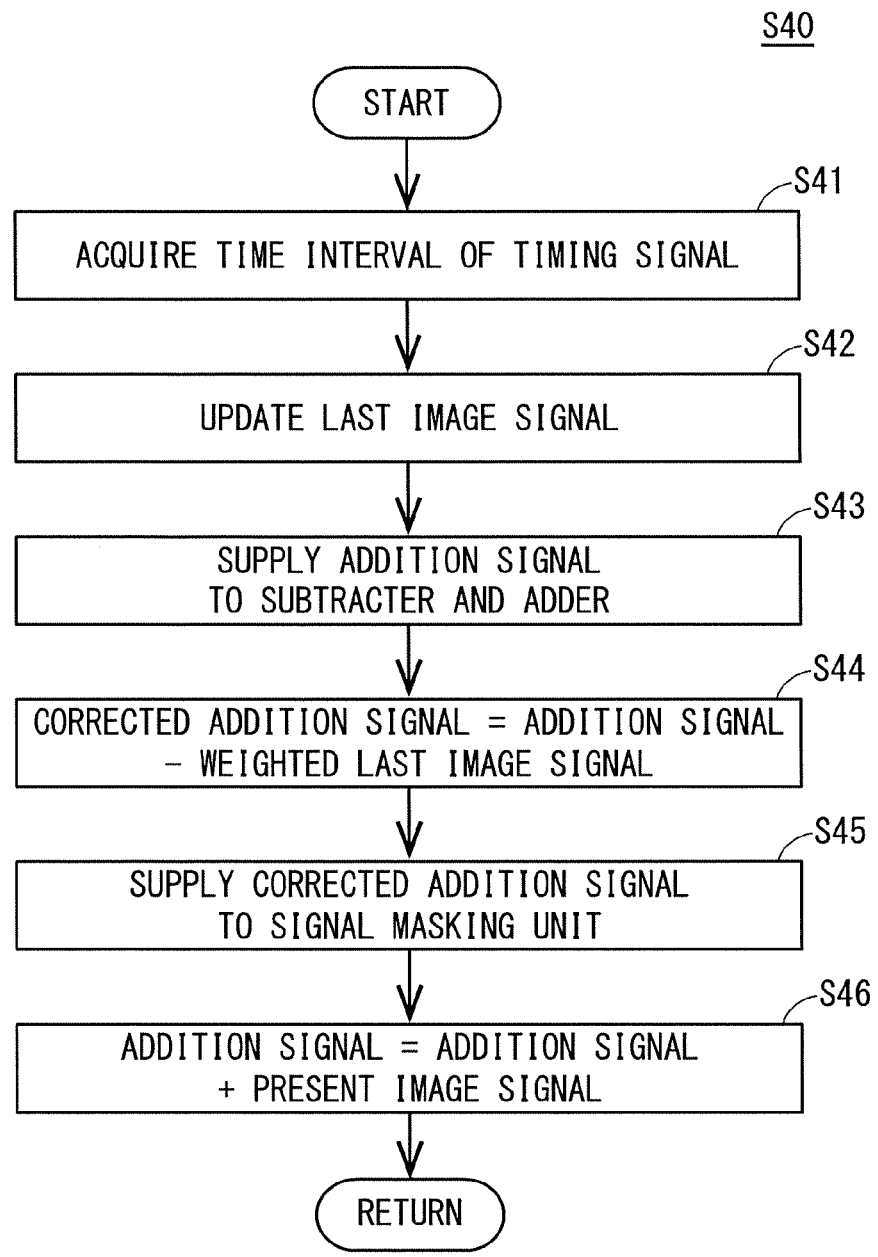
FIG. 11 is a flowchart illustrating an example of the operation of the image signal generating apparatus.

FIG. 11 is a flowchart illustrating an example of the operations of the generation of the corrected addition signal and an increase of the addition signal in Step S40 of FIG. 7.

The parameter generator 20 acquires the time interval T between the received timing signal and the last timing signal (Step S41), the last image signal just before the image signal L is stored as the last image signal Lb in the storage 10 through the delay circuit when the image signal L is input to the image signal generating apparatus 400 in synchronization with the received timing signal A (Step S42).

The image signal generating apparatus 400 supplies the addition signal M stored in the storage 12 to the subtracter 53 and the adder 54 (Step S43).

The subtracter 53 generates the corrected addition signal P by subtracting the weighted last image signal Lb from the supplied addition signal M (Step S44), and supplies the corrected addition signal P to the signal masking unit 60 (Step S45). The corrected addition signal P is obtained by the equation (5).

Because the mask signal MSK is set to 1, the generated corrected addition signal P is not supplied to the divider 70.

The image signal generating apparatus 400 performs processing of updating the addition signal M by adding the weighted present image signal L to the present addition signal M (Step S46). The addition signal M is the signal I0 obtained from the equation (3), and the addition signal M is supplied from the adder 54 to the storage 12 through the multiplexer 40. Therefore, the processing in Step S40 is ended, and the parameter generator 20 waits until the sampling signal B or the timing signal A is received (Steps S20 and S30).

When the sampling signal is received in Step S20, the parameter generator 20 generates the resizing parameter through the above processing in Step S50, and waits until the timing signal is received (Step S60).

When the timing signal $A_{k+1}$ just after the sampling signal $B_n$ is received in Step S60, the parameter generator 20 outputs the resizing parameter stored in the memory 25 to the multiplier 51 and the divider 70 (Step S70), and the image signal generating apparatus 400 performs the generation of the corrected addition signal P and the initialization of the addition signal M (Step S80).

When the processing in Step S80 is ended, the divider 70 performs output image signal generating processing (Step S90).

Figure 12:
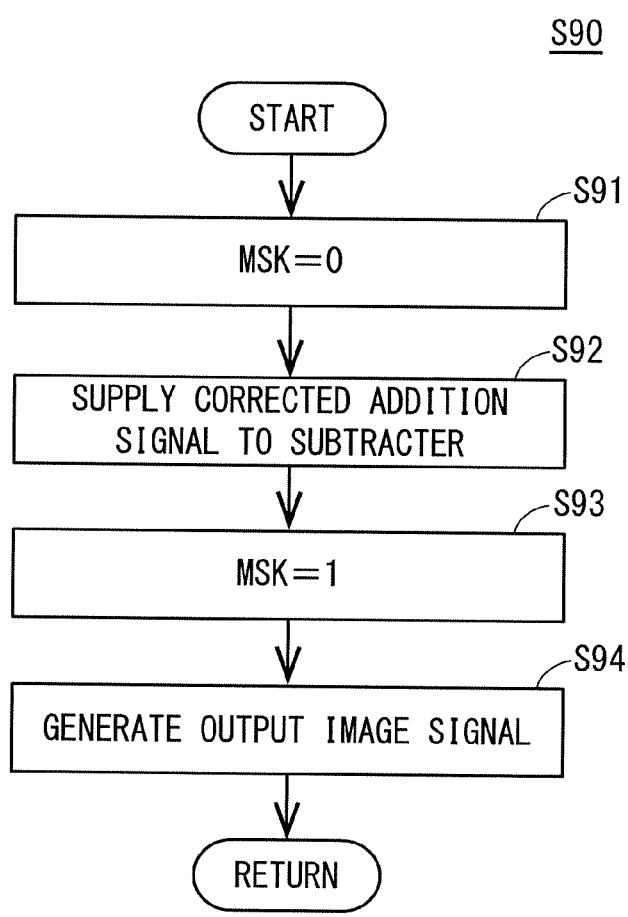
FIG. 12 is a flowchart illustrating an example of the operation of the image signal generating apparatus.

FIG. 12 is a flowchart illustrating an example of the operation of the output image signal generating processing.

The signal controller 30 sets the mask signal MSK to 0 such that the signal is supplied from the signal masking unit 60 to the divider 70 (Step S91).

The signal masking unit 60 supplies the corrected addition signal P supplied by the subtracter 53 to the divider 70 (Step S92). Then the signal controller 30 sets the mask signal MSK to 1 to prohibit the signal masking unit 60 from supplying the signal to the divider 70 (Step S93).

The divider 70 generates and outputs the output image signal Q in which the corrected addition signal P supplied from the signal masking unit 60 is divided by the divisor VD obtained by the equation (4). That is, the output image signal Q is obtained by weighted average processing.

Then, the parameter generator 20 waits until the sampling signal or the timing signal is received again (Steps S20 and S30), and the parameter generator 20 repeatedly generates the output image signal Q in response to the sampling signal B while repeats the processing corresponding to the reception of the timing signal A or sampling signal B.

As described above, based on the parameter PMf corresponding to the first sampling signal $Bf=B_{n-1}$ in the parameters PM generated by the parameter generator 20 and the parameter PMs corresponding to the second sampling signal $Bs=B_n$ input just after the parameter PMf, the image signal generator 90 (image signal generating apparatus 400) performs the generating processing of generating the output image signal by reconstructing the series of image signals corresponding to the time period until the input of the second sampling signal Bs since the input of the first sampling signal Bf in the plural image signals L that are sequentially input in time series in synchronization with each timing signal $A_k$. The image signal generator 90 sets the second sampling signal Bs to the new first sampling signal Bf in the next generating processing, and repeats the generating processing in response to each sampling signal $B_n$.

Based on the division ratio parameter DP corresponding to the last timing signal $A_k$, the image signal generator 90 repeatedly generates the following weighted signals Wa and Wb in response to each sampling signal $B_n$.

(1) The first weighted signal Wa in which the image signal $L_k$ input in synchronization with the last timing signal $A_k$ is weighted using a first ratio $Rf=Tb/Ta$ of the second time period Tb to the first time period Ta (2) The second weighted signal Wb in which the image signal $L_k$ is weighted using a second ratio $Rs=Tc/Ta$ of the third time period Tc to the first time period Ta.

The image signal generator 90 also repeats the following pieces of processing (a) and (b) in response to each sampling signal $B_n$.

(a) The processing in which the second weighted signal $Wb_{n-1}$ generated by treating the sampling signal $B_n$ as the second sampling signal Bs is used in the processing of generating the output image signal $Q_{n-1}$ (b) The processing in which the first weighted signal $Wa_n$ generated by treating the sampling signal $B_n$ as the new first sampling signal Bf is used in the processing of generating the next output image signal $Q_n$ In the image signal generating apparatus of the preferred embodiment having the above configuration, the parameter (resizing parameter) PM including the division ratio parameter DIV1 is dynamically and repeatedly generated in response to each sampling signal B. The processing of generating the output image signal Q is repeated in response to each sampling signal $B_n$ using the first weighted signal Wa and second weighted signal Wb, which are generated based on the division ratio parameter DIV1. Accordingly, the image data can accurately be resized in real time by the downscaling even if the period of the sampling signal $B_n$ is unknown or varies temporally.

In the image signal generating apparatus of the preferred embodiment having the above configuration, the division ratio parameter DIV1 is generated with respect to each sampling signal by counting how many times the second time period Tb is longer than the unit time period UT in which the first time period Ta is divided by the predetermined natural number. Accordingly, the value of the division ratio parameter DP=DIV1 is decreased, so that a circuit scale used in the processing of generating the output image signal Q can be reduced.

In the image signal generating apparatus of the preferred embodiment having the above configuration, the time interval T of the timing signals $A_{k-1}$ and $A_k$ adjacent to each other in time series in the timing signals is sequentially measured, and the division ratio parameter DIV1 corresponding to each sampling signal is generated based on the measured value. Accordingly, even if the period of the timing signal varies, the image data can accurately be resized.

In the image signal generating apparatus of the preferred embodiment having the above configuration, the length of the time period until the input of the immediate timing signal $A_{j+1}$ since the input of the timing signal $A_j$ before the last timing signal $A_k$ is used as the length of the first time period Ta with respect to each sampling signal and "j" is an integer satisfying the condition j<k. Therefore, at the time the sampling signal $B_n$ is detected, the division ratio parameter DP can be obtained without waiting for the timing signal $A_{k+1}$ just after the sampling signal $B_n$ of the parameter generating target. Accordingly, the time necessary for the generation of the parameter PM is shortened, so that the degradation of the generation speed of the output image signal Q can be suppressed even in a short period of the sampling signal B.

Although the present invention is described in detail above, the descriptions of all the aspects are not restrictive but only illustrative. Accordingly, various modifications and omissions of the preferred embodiment can properly be made without departing from the scope of the present invention.

Particularly, the symbols expressing each signal and numerical value can be generalized, and various changes of the generalized form can be made with respect to the signals, numerical formulas, and numerical values illustrated in the preferred embodiment.

While the invention has been shown and described in detail, the foregoing description is in all aspects illustrative and not restrictive. It is therefore understood that numerous modifications and variations can be devised without departing from the scope of the invention.

What is claimed is:

1. An image signal generating apparatus comprising:
    a parameter generator including;
    a first processing element that sequentially inputs a plurality of image signals L in synchronization with each timing signal A generated in time series;
    a second processing element that sequentially inputs each sampling signal B generated in time series;
    a third processing element that dynamically generates a parameter PM in response to the generation of said each sampling signal B, said parameter PM expressing a temporal relationship between the generation of said each timing signal A and the generation of said each sampling signal B; and
    an image signal generator including;
    a fourth processing element that identifies a series of image signals in said plurality of image signals L, the series of image signals corresponding to a time period until the generation of said sampling signal $B_{n+1}$ since the generation of said sampling signal $B_n$, n being an index indicating a series of integers, and a fifth processing element that reconstructs said series of image signals based on parameter values $PM_n$, and $PM_{n+1}$ to generate an output image signal $Q_n$ corresponding to said sampling signal $B_n$, said parameter values $PM_n$ and $PM_{n+1}$ being values provided to said parameter PM according to sampling signals $B_n$ and $B_{n+1}$ temporally adjacent to each other, wherein said fourth and fifth processing elements operate when said each sampling signal B is received thereby updating an integer n, said parameter value $PM_n$ includes a division ratio parameter DP, said division ratio parameter DP reflecting a ratio at which a first time period Ta is divided into a second time period Tb and a third time period Tc, said first time period Ta is a time interval until the generation of a timing signal $A_{k+1}$ since the generation of a timing signal $A_k$, and said sampling signal $B_n$ is generated in said first time period Ta, k being an integer defined by an integer n, said second time period Tb is a time interval until the generation of said sampling signal $B_n$ since the generation of said timing signal $A_k$, said third time period Tc is a time interval in which said second time period Tb is excluded from said first time period Ta, and said fifth processing element includes;

a processing element that generates a first weighted signal Wa and a second weighted signal Wb based on said division ratio parameter DP, said first weighted signal Wa being obtained by weighting a value of an image signal $L_k$ according to a first ratio Rf=Tb/Ta, said second weighted signal Wb being obtained by weighting said image signal $L_k$ according to a second ratio Rs=Tc/Ta, and a processing element that generates said output image signal $Q_n$ using said first weighted signal $Wa_{n+1}$ generated according to said sampling signal $B_{n+1}$ and said second weighted signal $Wb_n$ already generated according to said sampling signal $B_n$.

2. The image signal generating apparatus according to claim 1, wherein said parameter generator counts said division ratio parameter DP as a multiple number of a unit time period UT, and said unit time period UT is obtained by dividing said first time period Ta by a predetermined natural number.

3. The image signal generating apparatus according to claim 1, wherein said parameter generator measures the time interval of the timing signals $A_k$ and $A_{k+1}$ adjacent to each other in a time-series manner, and generates said division ratio parameter DP based on a measured value.

4. The image signal generating apparatus according to claim 3, wherein said parameter generator uses a time period until input of a timing signal $A_{j+1}$ since input of a timing signal $A_j$ as a value of said first time period Ta, where j is less than k.

5. An image signal generating method comprising:

a parameter generating step, said parameter generating step including;

a first step of sequentially inputting a plurality of image signals L in synchronization with each timing signal A generated in time series;

a second step of sequentially inputting each sampling signal B generated in time series;

a third step of dynamically generating a parameter PM in response to the generation of said each sampling signal B, said parameter PM expressing a temporal relationship between the generation of said each timing signal A and the generation of said each sampling signal B; and an image signal generating step, said image signal generating step including;

a fourth step of identifying a series of image signals in said plurality of image signals L, the series of image signals corresponding to a time period until the generation of said sampling signal $B_{n+1}$ since the generation of said sampling signal $B_n$, being an index indicating a series of integers, and a fifth step of reconstructing said series of image signals based on parameter values $PM_n$, and $PM_{n+1}$ to generate an output image signal $Q_n$ corresponding to said sampling signal $B_n$, said parameter values $PM_n$ and $PM_{n+1}$ being values provided to said parameter PM according to sampling signals $B_n$ and $B_{n+1}$ temporally adjacent to each other, wherein said fourth and fifth steps are executed when said each sampling signal B is received thereby updating an integer n, said parameter value $PM_n$ includes a division ratio parameter DP, said division ratio parameter DP reflecting a ratio at which a first time period Ta is divided into a second time period Tb and a third time period Tc, said first time period Ta is a time interval until the generation of a timing signal $A_{k+1}$ since the generation of a timing signal $A_k$, and said sampling signal $B_n$ is generated in said first time period Ta, k being an integer defined by an integer n, said second time period Tb is a time interval until the generation of said sampling signal $B_n$ since the generation of said timing signal $A_k$, said third time period Tc is a time interval in which said second time period Tb is excluded from said first time period Ta, and said fifth step includes;

a step of generating a first weighted signal Wa and a second weighted signal Wb based on said division ratio parameter DP, said first weighted signal Wa being obtained by weighting a value of an image signal $L_k$ according to a first ratio Rf=Ta/Tb, said second weighted signal Wb being obtained by weighting said image signal $L_k$ according to a second ratio Rs=Tc/Ta, and a step of generating said output image signal $Q_n$ using said first weighted signal $Wa_{n+1}$ generated according to said sampling signal $B_{n+1}$ and said second weighted signal $Wb_n$ already generated according to said sampling signal B.

* * * * *